(No Model.)

G. F. DE SOLOMÉ.
CONNECTION FOR GALVANIC BATTERIES.

No. 344,947. Patented July 6, 1886.

Witnesses:
C. Sundgren
Emil Herter

Inventor:
George F. de Solomé
by his attys
Brown & Hall

UNITED STATES PATENT OFFICE.

GEORGE F. DE SOLOMÉ, OF NEW YORK, N. Y., ASSIGNOR TO J. SEAVER PAGE, OF SAME PLACE.

CONNECTION FOR GALVANIC BATTERIES.

SPECIFICATION forming part of Letters Patent No. 344,947, dated July 6, 1886.

Application filed November 21, 1885. Serial No. 183,472. (No model.)

*To all whom it may concern:*

Be it known that I, GEORGE F. DE SOLOMÉ, of the city and county of New York, in the State of New York, have invented a new and useful Improvement in Connections for Galvanic Batteries, of which the following is a specification.

An important object of my invention is to provide for readily connecting together in series a number of galvanic batteries, so that the circuit from them will be complete without the use of any binding-screws or other similar parts, and so that the battery elements in all the jars may be raised or lowered without breaking the circuit or connections.

Although my invention is more particularly intended for use in connection with a battery such as is shown in my application for United States Letters Patent Serial No. 183,471, filed November 21, 1885, it may be employed in connection with other batteries in which there are pole-pieces projecting upward from the top of the jar, and in which the battery elements may be raised to remove them from the battery-liquid.

In carrying out my invention I employ a series of batteries having pairs of upwardly-projecting pole-pieces which are insulated from each other, but usually consist of two parallel strips placed on opposite sides of a rod or bar of insulating material to which they are secured. Above the battery-jars I arrange horizontally a rod or bar which has secured upon it metal strips, the ends of which form elastic or spring fingers that embrace and make contact with the pole-pieces of the several batteries to complete the circuit from end to end of the series of batteries. The two terminals of the electric circuit may be connected with the spring-fingers at opposite ends of the series, and the circuit through the series of batteries will be complete whether the pole-pieces and their attached elements are raised or lowered.

Figure 1:
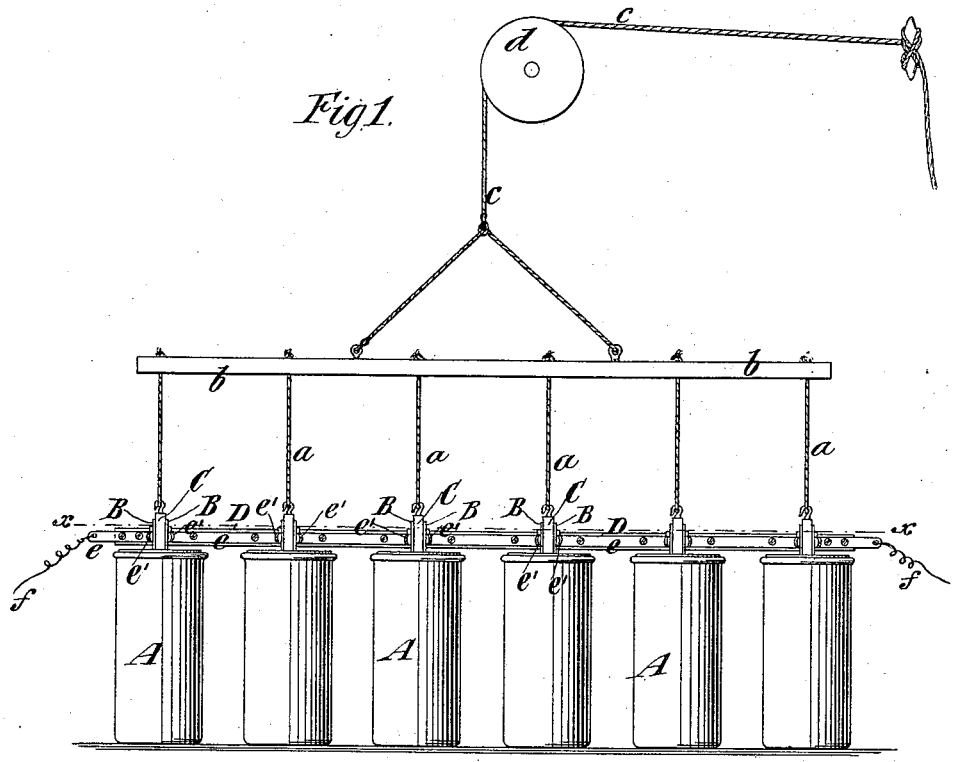
Figure 2:
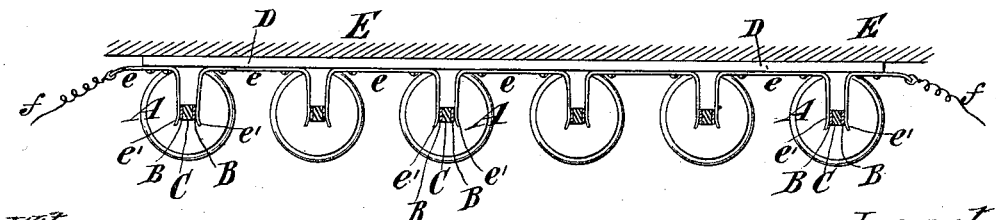

In the accompanying drawings, Figure 1 is an elevation of a series of six batteries connected according to my invention; and Fig. 2 is a horizontal section upon the plane of the dotted line X X, Fig. 1.

Similar letters of reference designate corresponding parts in both figures.

A designates the battery-jars, and B B the pole-pieces which project upward through the lids of the jars, and, as here shown, consist of parallel strips secured to the opposite sides of the interposed rod or bar C of insulating material.

To the pole-pieces B B are secured the battery elements, and I have represented cords $a$ as extending upward from the several rods or bars C and all connected with the horizontal bar $b$, which in turn is suspended by a cord, $c$, passing over a pulley, $d$. By drawing downward upon the free end of the cord $c$ the bar $b$ and the pole-pieces and elements of all the batteries of the series may be raised simultaneously.

Arranged horizontally above the battery-jars A, but a short distance above them, is a horizontal bar or rod, D, which may be attached to the wall or any other suitable support. (Designated in Fig. 2 by the letter E.) This rod or bar serves simply as a base to which are attached metal strips $e$, the ends of which are bent outward to form elastic or spring fingers $e'$, as best shown in Fig. 2.

It will be clearly seen from Fig. 2 that there are provided for each battery-jar a pair of spring-fingers, $e'$, those of each pair forming terminals, and as each pair of spring-fingers embrace and make contact with the pole-pieces B of the corresponding battery-jar it will be seen that the circuit through the spring-fingers $e'$ and pole-pieces B is complete from end to end of the series, and that to utilize the current of the battery it is only necessary to connect the electric terminals $f$ with those metal strips $e$ which are at opposite ends of the series of batteries, as shown at Fig. 2. Of course the same result would be produced by connecting the spring-fingers $e'$, which are now formed at opposite ends of the strip $e$ by means of a wire secured upon the bar D.

By my invention the working-connections for a series of batteries composed of any number of jars may be made without any screws or other mechanical devices which are liable to become fixed by corrosion, and which frequently cause considerable trouble in the use of batteries. It will also be seen that the spring-fingers $e'$ make equally good contact with the pole-pieces B, whether the pole-pieces and battery elements attached thereto be raised or lowered, and that such raising or lowering of the pole-pieces and elements may be performed without any manipulation of the connections between the batteries of the series.

What I claim as my invention, and desire to secure by Letters Patent, is—

1. The combination, with a series of batteries having pairs of upwardly-projecting pole-pieces insulated from each other, of a rod or bar arranged horizontally above the battery-jars, and metal strips secured thereto and forming spring-fingers which embrace and make contact with the pole-pieces of the several batteries, and complete the circuit from end to end of the series of batteries, substantially as herein described.

2. The combination, with a series of batteries having pairs of upwardly-projecting and parallel pole-pieces insulated from each other, of connections whereby the pole-pieces and elements of all the batteries may be raised, a rod or bar arranged horizontally above the battery-jars, and metal strips secured to said rod or bar and forming spring-fingers which embrace and make contact with the pole-pieces of the several batteries, and complete the circuit from end to end of the series of batteries, substantially as herein described.

GEORGE F. DE SOLOMÉ.

Witnesses:
FREDK. HAYNES,
HENRY McBRIDE.